US012561554B2

(12) United States Patent
Vogel et al.

(10) Patent No.: US 12,561,554 B2
(45) Date of Patent: Feb. 24, 2026

(54) ERROR IDENTIFICATION FOR AN ARTIFICIAL NEURAL NETWORK

(71) Applicant: Robert Bosch GmbH, Stuttgart (DE)

(72) Inventors: Sebastian Vogel, Schaidt (DE);
Christoph Schorn, Leonberg (DE);
Michael Klaiber, Stuttgart (DE)

(73) Assignee: ROBERT BOSCH GMBH, Stuttgart (DE)

( * ) Notice: Subject to any disclaimer, the term of this patent is extended or adjusted under 35 U.S.C. 154(b) by 1192 days.

(21) Appl. No.: 17/172,707

(22) Filed: Feb. 10, 2021

(65) Prior Publication Data

US 2021/0256376 A1    Aug. 19, 2021

(30) Foreign Application Priority Data

Feb. 19, 2020    (DE) .......................... 102020202093.0

(51) Int. Cl.
*G06N 3/08* (2023.01)
*G06N 3/04* (2023.01)

(52) U.S. Cl.
CPC ................. *G06N 3/08* (2013.01); *G06N 3/04* (2013.01)

(58) Field of Classification Search
CPC ........ G06N 3/0895; G06N 3/09; G06N 3/091;
G06N 3/092; G06N 3/094; G06N 3/096;
G06N 3/098; G06N 3/0985; G06N
3/0464; G06N 3/0475; G06N 3/0495;
G06N 3/0499; G06N 3/10; G06N 3/08;
G06N 3/04;
(Continued)

(56) References Cited

U.S. PATENT DOCUMENTS 11,232,016 B1 *    1/2022    Huynh ................... G06N 3/045
2016/0379109 A1 *    12/2016    Chung ................. G06N 3/0464
706/26
2018/0174658 A1 *    6/2018    Kikuchi ................... G06N 3/08
(Continued)

FOREIGN PATENT DOCUMENTS

EP    0976039 B1    2/2008
EP    3506095 A2    7/2019
(Continued)

OTHER PUBLICATIONS

Dietterich et al., "Solving Multiclass Learning Problems via Error-Correcting Output Codes," https://arxiv.org/pdf/cs/9501101, (Year: 1995).*

*Primary Examiner* — David Yi
*Assistant Examiner* — Nicholas Shine
(74) *Attorney, Agent, or Firm* — NORTON ROSE FULBRIGHT US LLP

(57) ABSTRACT

A device and method for machine learning using an artificial neural network. For a calculation hardware for the artificial neural network, a layer description is provided, which defines at least one part of a layer of the artificial neural network, the layer description defining a tensor for input values of at least one part of this layer, a tensor for weights of at least one part of this layer, and a tensor for output values of at least one part of this layer, in particular of its starting address. A message that includes a start address of the tensor for the input values, or of the tensor for the weighs, or of the tensor for the output values is sent by the calculation hardware for transfer of the input values, or the weights, or the output values, is sent by the calculation hardware.

15 Claims, 2 Drawing Sheets

(58) Field of Classification Search
CPC .... G06N 3/063; G06N 20/00; G06F 11/2294;
G06F 11/0751; G06F 11/0772; G06F
11/1476
See application file for complete search history.

(56) References Cited

U.S. PATENT DOCUMENTS

2018/0300600 A1* 10/2018 Ma ............................ G06T 1/20
2019/0121734 A1    4/2019 Akopyan et al.
2019/0227871 A1*   7/2019 Wu ....................... G06F 3/0673
2019/0265701 A1    8/2019 Troia et al.
2019/0317857 A1* 10/2019 Khan .................. G06F 11/1012
2019/0392296 A1  12/2019 Brady et al.
2020/0117453 A1*   4/2020 Zhang .................... G06N 3/048
2020/0159809 A1*   5/2020 Catthoor .................. G06N 3/04
2021/0173787 A1*   6/2021 Nagy .................. G06F 13/1668

FOREIGN PATENT DOCUMENTS

EP          3640862 A1    4/2020
WO       2019009993 A1    1/2019
WO       2019157812 A1    8/2019

* cited by examiner

ERROR IDENTIFICATION FOR AN ARTIFICIAL NEURAL NETWORK

CROSS REFERENCE

The present application claims the benefit under 35 U.S.C. § 119 of German Patent Application 102020202093.0 filed on Feb. 19, 2020, which is expressly incorporated herein by reference in its entirety.

FIELD

The present invention is directed to a method and to a device for machine learning.

BACKGROUND INFORMATION

Machine learning may be based on artificial neural networks, which are implemented in a calculation hardware, a so-called K1 accelerator.

An error identification or an error correction in such an implemented artificial neural network may be carried out based on a test sum, which is determined in the calculation hardware.

This enables a localization and correction of erroneous neural output values, which may occur during the calculation of neural functions of the neural network, for example, triggered by a malfunction of the calculation hardware.

It is desirable to further improve the error identification or an error correction for machine learning.

SUMMARY

This may be achieved by a method and by a device in accordance with example embodiments of the present invention.

In accordance with an example embodiment of the present invention, a method for machine learning provides that for a calculation hardware, a layer description is provided for the artificial neural network, which defines at least one part of a layer of the artificial neural network, the layer description defining a tensor for input values of at least one part of this layer, a tensor for weights of at least one part of this layer and a tensor for output values of at least one part of this layer, in particular of its start address, a message that includes a start address of the tensor for these input values in a memory being sent by the calculation hardware for transferring these input values, a message that includes a start address of the tensor for these weights in a memory being sent by the calculation hardware for transferring these weights, or a message that includes a start address of the tensor for these output values in a memory being sent by the calculation hardware for transferring these output values. In this way, a communication takes place between the calculation hardware and a memory controller that includes a predefined data format. In this way, the memory controller is able to communicate with arbitrary calculation hardware that supports this data format.

In one aspect of the present invention, a network description for the artificial neural network is provided for the calculation hardware, which includes a list for a number of layer descriptions, one layer description of the number of layer descriptions including a number of memory tile descriptions, one memory tile description from the number of memory tile descriptions including the start address of the tensor for input values of the at least one part of this layer, the start address of the tensor for weights of the at least one part of this layer and the start address of the tensor for output values of the at least one part of this layer, a message that identifies this memory tile description in the list being sent by the calculation hardware, the memory tile description being received in response to this message, and the start addresses of the tensors being determined as a function of the memory tile description. By successively processing the list, the calculation hardware is able to successively request the descriptions of the memory tiles for all calculations, evaluate and then, via direct access to the correct memory location, from there read input values or weights or write output values.

A plurality of weights is preferably transferred from a memory via a memory controller to the calculation hardware for storing in the calculation hardware for the artificial neural network, a plurality of input values being transferred from the memory via the memory controller for storing in the calculation hardware for the artificial neural network, a sum being determined as a function of the plurality of weights while the plurality of weights is transferred from the memory via the memory controller to the calculation hardware, a reference value being determined as a function of the plurality of input values and of the sum while the plurality of input values is transferred from the memory via the memory controller for storing in the calculation hardware, a test sum being determined as a function of the plurality of output values while a plurality of output values is received by the calculation hardware at the memory controller, the test sum being checked in a comparison with the reference value, and an error being identified or not depending on the result of the comparison. In this way, the error identification is carried out outside the calculation hardware. This method is useful for increasing a reliability of calculation hardware for machine learning and for distributing reliability units and functional units of calculation hardware for machine learning. The calculation of the test sum and of the reference value and the comparison of test sum and reference value take place outside the calculation hardware, in the memory controller. With the aid of this added safety mechanism, the calculation hardware is able, for example, to be used by an external provider.

In one aspect of the present invention, a plurality of weights is transferred from a memory via a memory controller to the calculation hardware for storing in the calculation hardware for the artificial neural network, a plurality of input values being transferred from the memory via the memory controller for storing in the calculation hardware for the artificial neural network, a sum being determined as a function of the plurality of input values while the plurality of input values is transferred from the memory via the memory controller to the calculation hardware, a reference value being determined as a function of the plurality of weights and of the sum while the plurality of weights is transferred from the memory via the memory controller for storing in the calculation hardware, a test sum being determined as a function of the plurality of output values while a plurality of output values are received by the calculation hardware at the memory controller, the test sum being checked in a comparison with the reference value, and an error being identified or not depending on the result of the comparison. This approach is one alternative to the above-described error identification.

An error identification is preferably carried out for at least one layer of the artificial neural network. In this way, the error identification is carried out for one or for multiple layers of a network.

The reference value is preferably determined as a function of the plurality of input values and as a function of the reference core while the plurality of input values is transferred. In this way, a further part of the error identification is carried out already during the transfer.

A read request for a plurality of weights of one layer of an artificial neural network is preferably received, the plurality of weights being read from the memory. The error identification in this aspect is triggered by the read request to a memory controller.

A read request for a plurality of input values for the layer of the artificial neural network is preferably received, the plurality of input values being read from the memory. The error identification in this aspect is continued by the read request to a memory controller.

In one aspect of the present invention, the plurality of output values of the layer is determined as a function of the plurality of input values and of the plurality of weights. The method in this aspect also includes a calculation in the calculation hardware.

If no error is identified, a result value is preferably determined as a function of an output value of the plurality of output values and as a function of an activation function.

If an error is identified, an error signal may be sent by the memory controller, in particular, to a host.

If an error is identified, a recalculation of at least one portion of the output values is preferably triggered by the memory controller. The error identification may narrow the error typically to a subset of the output values, which may be corrected by a recalculation.

In accordance with an example embodiment of the present invention, a device is designed to carry out the example method(s) described herein.

BRIEF DESCRIPTION OF THE DRAWINGS

Further advantageous specific embodiments result from the description and from the figures.

DETAILED DESCRIPTION OF EXAMPLE EMBODIMENTS

Figure 1:
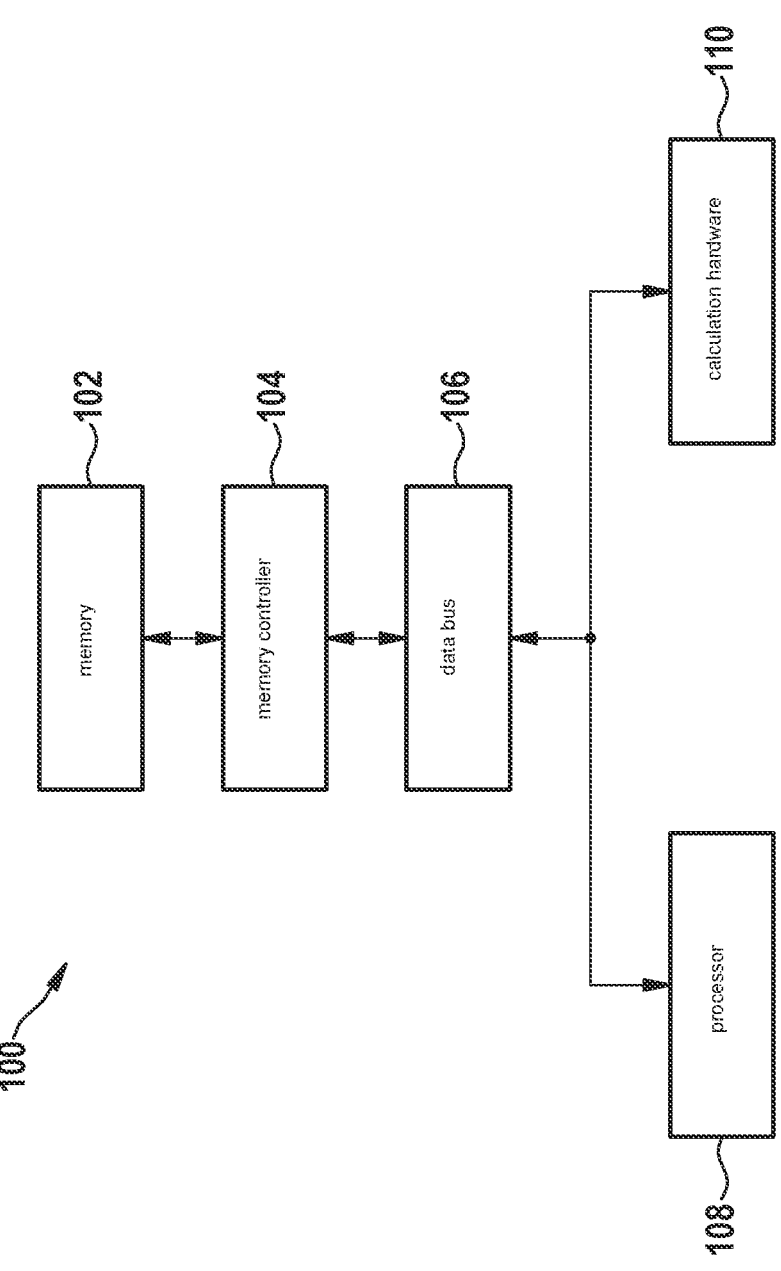
FIG. 1 schematically shows a representation of a device for machine learning, in accordance with an example embodiment of the present invention.

A device 100 for machine learning is schematically depicted in FIG. 1.

Device 100 includes a memory 102, a memory controller 104, a data bus 106, a processor 108, and a calculation hardware 110.

Memory controller 104 is designed to receive read requests from calculation hardware 110 via data bus 106 to memory 102, and in response to a read request to read data from memory 102 and to send them via data bus 106 to calculation hardware 110. Processor 108 is designed to communicate with memory controller 104 via data bus 106 for implementing a method for machine learning. In the example, it is provided that processor 108 predefines hyperparameters, weights and input values for an artificial neural network, with which the machine learning is to be carried out. In the example, it is provided that processor 108 determines a result of the machine learning as a function of output values of the artificial neural network. In this regard, it is irrelevant whether a classification, a regression or another calculation is to be carried out with the machine learning.

A communication between calculation hardware 110 and memory 102 takes place in the example, in particular, exclusively via memory controller 104. A communication between processor 108 and memory 102 takes place in the example, in particular, exclusively via memory controller 104. With the aid of this separation between processor 108, memory controller 104, calculation hardware 110 and memory 102, the method described below for error identification and a method based thereon for error handling is particularly effectively implementable.

The communication between calculation hardware 110 and memory controller 104 takes place in the example with a predefined data format. One example of such a data format is indicated in the following tensor description:

address in the memory
tensor form
memory allocation
tensor data

"Address in the memory" in this case defines in the example a start address addr_layer of the tensor in memory 102.

The tensor form in the example defines for a plurality of input values or for a plurality of output values for a layer of the artificial neural network its dimensions B, W, H, C, for example, a tensor T, where $B=2$, $W=320$, $H=640$, $C=3$. The form of a tensor T is also referred to below as T.shape. For a tensor T having the dimensions $B=2$, $W=320$, $H=640$, $C=3$, T.shape corresponds to $=(B=2, W=320, H=640, C=3)$. The tensor form in the example, defines for a plurality of weights for a layer of the artificial neural network its dimensions, for example, Kx, Ky, Ci, Co. For example, $Kx=2$, $Ky=3$, $Ci=512$, $Co=1024$.

A dimension configuration or memory mapping function in the example defines the memory allocation in memory 102. The memory mapping function forms a multi-dimensional tensor on one-dimensional memory 102. The dimension configuration describes a rank, a size, a data type of an N-dimensional field, which is storable in memory 102. The memory mapping function computes for a program that intends to access elements of a field, their memory address in memory 102. A sequence of dimensions may be stored in the N-dimensional field. A first value of the sequence in the example represents a most-minor dimension. A final value of the sequence in the example represents a most-major dimension.

In the example, this is defined for the plurality of input values or the plurality of output values by a sequence BWHC, the last mentioned dimension, C, being the most-major dimension. For the plurality of weights, in the example, this is defined by a sequence KxKyCiCo.

The tensor data are the data, i.e., the individual bits or bytes or, for a burst mode, a data block or multiple data blocks.

Calculation hardware 110 in the example includes memory tiles. In the example, a memory tile Ifmap is defined for one tensor including a plurality of input values according to a tensor description for the plurality of input values. In the example, a memory tile Ofmap is defined for one tensor including a plurality of output values according to a tensor description for the plurality of output values. In the example, a memory tile weights is defined for one tensor including a plurality of weights according to a tensor description for the plurality of weights.

Calculation hardware 110 in this example is designed to determine output values for the memory tile Ofmap as a function of the input values from the memory tile Ifmap and of the memory tile weights for the weights.

For this assignment, a memory tile description is defined in the example:

Ifmap

Ofmap

Weights

The artificial neural network is defined in the example by a layer description and a network description.

Layer Description:

List of the memory tile descriptions

Operator

Activation function

The list of the memory tile descriptions in this example includes all memory tile descriptions for the method for machine learning. The operator defines the function of the layer, i.e., for example, Conv2D, Depthwise-Separable Convolution, Sum. Other operations may be equally provided. The activation function, generally a non-linear function of the layer such as, for example, rectified linear unit, ReLU. Another activation function, for example, sigmoid or tanh, may also be used.

Network Description:

List of the Layer Descriptions

The list of the layer descriptions in the example includes all layers that are to be used for the method for machine learning.

Only sub-aspects of the machine learning with calculation hardware may also be carried out. In this case, network descriptions and/or memory tile descriptions are used only for these sub-aspects. Other calculation steps may also be carried out by processor 108 separately therefrom.

Figure 2:
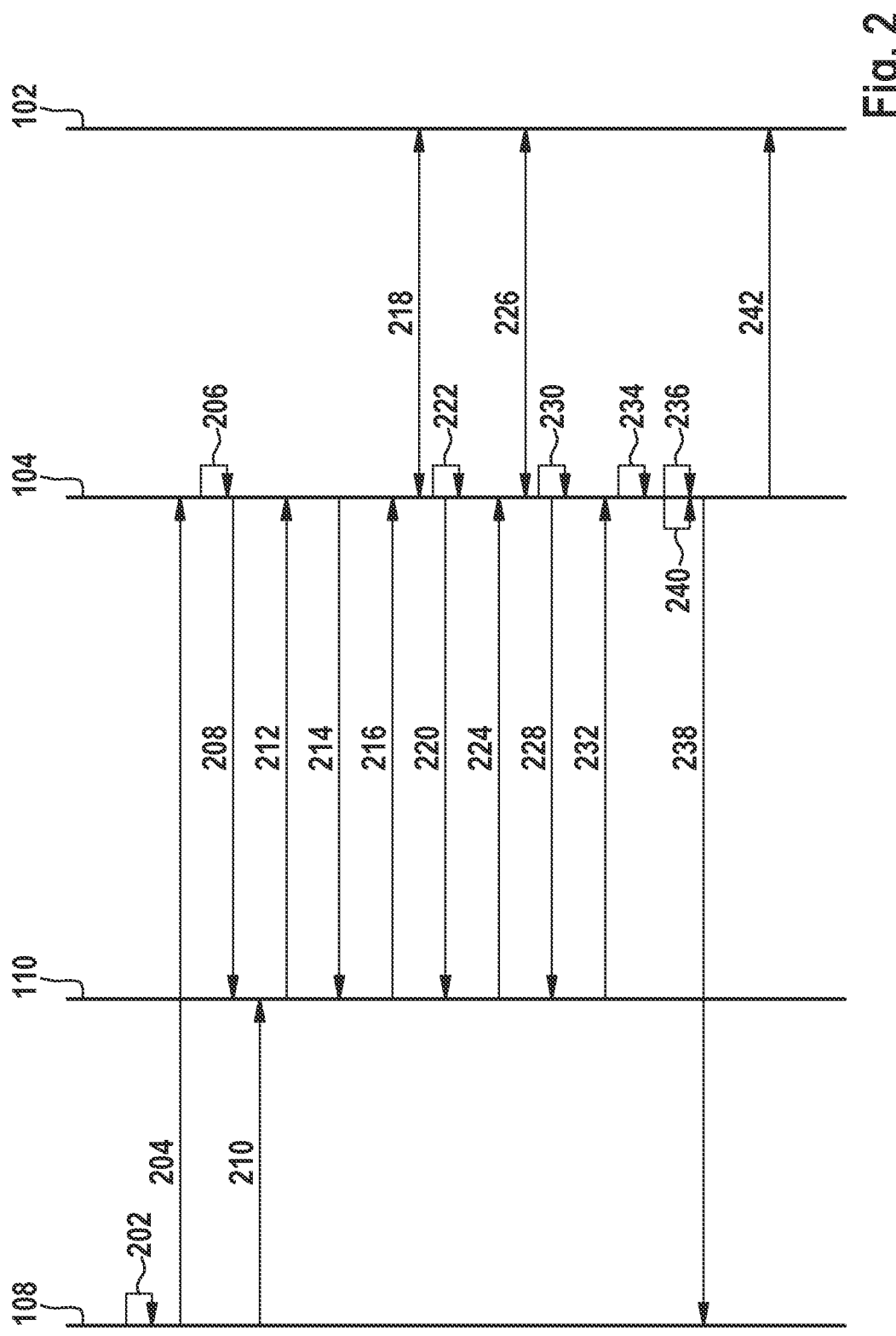
FIG. 2 shows steps in one method for machine learning, in accordance with an example embodiment of the present invention.

In the example, the method is described with reference to FIG. 2 as exemplified by an implementation for Conv2D on calculation hardware 110. Other operations are implemented accordingly. A rectified linear unit, ReLU, is used in the example as an activation function, which is implemented on memory controller 104. Another activation function, for example, sigmoid, may also be used.

In the description below, an exemplary protocol, i.e., an established format, is represented for communicating between memory controller 104, memory 102 and calculation hardware 110.

In the description below, it is assumed that processor 108 determines in a step 202 which of the operations and activation functions are to be carried out on memory controller 108 and which on calculation hardware 110.

In this example, the layer description for the layer of the artificial neural network that is to be calculated is determined in step 202.

The layer description for one layer of the artificial neural network is transferred in this example in a step 204.

In a step 206, memory 102 is configured in a defined manner by memory controller 104 and by processor 110. Memory controller 104 may also determine, as a function of the layer description, a required memory size, which defines this layer description. Memory controller 104 may also, as a function of the layer description, reserve the required memory size, in particular, for all data structures. In the example, the layer description is written in a step 208 into memory 102 at start address addr_layer. Start address addr_layer in the example is sent by processor 108 and received by memory controller 104. Start address addr_layer in this example is used by processor 108 and by memory controller 104, in order to transfer data between them. The plurality of input data values, the plurality of output data values and the plurality of weights are clearly identified as such in the example due to their respective start address addr_layer.

In the example, it is provided that processor 108 sends an optional start signal 210 to calculation hardware 110. Start signal 210 starts a calculation in calculation hardware 110. Start signal 210 is sent preferably after completion of the configuration. The completion of the configuration may optionally be transferred by memory controller 104 to processor 108.

Steps 202, 204, 206, 208 may be optional, for example, if the configuration has already been carried out before the method starts.

The following steps are carried out successively in the example for n layers, each of which contains multiple memory tiles. Index n is the length of the list of the layer descriptions in the network description. Each layer contains multiple memory tile descriptions, which are marked below with index m. The number of memory tile descriptions is not necessarily the same in all layers.

One exemplary description is schematically represented below:

Network description:

Layer description 1

Memory Tile Description 1 ifmap (tensor description a)

ofmap (tensor description b)

weight (tensor description c) . . .

. . .

Memory Tile Description m ifmap (tensor description a)

ofmap (tensor description b)

weight (tensor description c) . . .

. . .

Layer Description n

Memory Tile Description 1 ifmap (tensor description a)

ofmap (tensor description b)

weight (tensor description c)

. . .

Memory Tile Description m ifmap (tensor description a)

ofmap (tensor description b)

weight (tensor description c)

Tensor Description address in the memory=start address addr_layer tensor form=dimension B, W, H, C, memory allocation=rank, size, data type of an N-dimensional field in the memory tensor data=sequence of a plurality of a) input values for ifmap b) output values for ofmap c) weights for weights.

In a step 212, the m-th memory tile descriptions of the n-th layer description is requested at calculation hardware 110 from the list of the layer descriptions. A corresponding abbreviated form is:

neural_network_descriptor[n].tile[m].

In the example, the m-th memory tile descriptions of the n-th layer description is requested by memory controller 104.

In a step 214, the m-th memory tile descriptions of the n-th layer description from the list of the layer descriptions is received at calculation hardware 110. In the example, the m-th memory tile descriptions of the n-th layer description is received by memory controller 104. Thus, start address addr_layer of all memory tiles, which contain data and operations required for this calculation step, is known at calculation hardware 110.

In a step 216, a read request for a plurality of weights of the m-th memory tile descriptions of the n-th layer of the artificial neural network is transferred. In the example, the read request is sent by calculation hardware 110. In the example, the read request is received by memory controller 104. The read request in the example includes start address addr_layer and the memory allocation for the plurality of weights of the m-th memory tile descriptions of the n-th layer in memory 102.

In a step 218, the plurality of weights is read from memory 102. In the example, memory 102 is read by memory controller 104 at the point defined by start address addr_layer for the plurality of weights with the length predefined by the memory allocation.

In a step 220, the plurality of weights that have been requested via step 216 is transferred to calculation hardware 110. For the m-th memory tile descriptions of the n-th layer, the plurality of weights in the example is identified by neural_network_descriptor [n].tile[m]weights.

In a step 222, a reference core CK is determined in the example as a function of the plurality of weights while the plurality of weights is transferred:

$$CK=\text{Sum}(\text{neural\_network\_descriptor}[n].\text{tile}[m].\text{weights,dimension}=Co),$$

where
neural_network_descriptor[n].tile[m]].weights
defines the plurality of weights of the m-th memory tile description of the n-th layer, sum defines an addition of the plurality of weights of the n-th layer along one dimension of the tensor of the weights of the n-th layer, and dimension defines the dimension via which adding occurs, in the example, Co. Reference core CK in this example has a form CK.shape=(Kx, Ky, Ci). Reference core CK is determined in memory controller 104. Reference core CK may be stored in memory 102 for purposes of optimization.

In a step 224, a read request for a plurality of input values of the m-th memory tile descriptions of the n-th layer of the artificial neural network is transferred. In the example, the read request is sent by calculation hardware 110. In the example, the read request is received by memory controller 104. The read request in the example includes start address addr_layer and the memory allocation for the plurality of input values of the m-th memory tile descriptions of the n-th layer in memory 102.

In a step 226, the plurality of input data values is read from memory 102. In the example, memory 102 is read by memory controller 104 at the point defined by start address addr_layer for the plurality of input values with the length defined by the memory allocation.

In a step 228, the plurality of input values is transferred for storing in the memory tile of calculation hardware 110 for the artificial neural network. For the m-th memory tile descriptions of the n-th layer, the plurality of input values is identified in the example by neural_network_descriptor[n].tile[m].ifmap.

In a step 230, a reference value CAR is determined in the example as a function of the plurality of input values and as a function of reference core CK while the plurality of input values is transferred:

$$CAR=o_c=\text{Conv2D}(\text{neural\_network\_descriptor}[n].\text{tile}[m].\text{ifmap},CK),$$

where
neural_network_descriptor[n].tile[m].ifmap
defines the plurality of the input values of the m-th memory tile descriptions of the n-th layer, and where reference core CK of the m-th memory tile descriptions of the n-th layer is added, i.e., concatenated, to the plurality of the input values of the m-th memory tile descriptions of the n-th layer for the calculation of reference value CAR of the m-th memory tile descriptions of the n-th layer. Conv2D in this example identifies a two-dimensional convolution of the plurality of input values
neural_network_descriptor[n].tile[m].ifmap
with reference core CK of the m-th memory tile descriptions of the n-th layer.

It may be provided to write reference value CAR into memory 102.

In a step 232, the plurality of output values of the m-th memory tile descriptions of the n-th layer is determined at the calculation hardware 110 as a function of the plurality of input values of the m-th memory tile descriptions of the n-th layer and of the plurality of weights of the n-th layer. The plurality of output values of the m-th memory tile descriptions of the n-th layer is identified by Ofmap in the example and determined, for example, as:

$$\text{Ofmap}=\text{Conv2D}(\text{neural\_network\_descriptor}[n].\text{tile}[m].\text{ifmap},\text{neural\_network\_descriptor}[n].\text{tile}[m].\text{weights})$$

Conv2D in this example identifies a two-dimensional convolution of the plurality of input values
neural_network_descriptor[n].tile[m].ifmap
with the plurality of weights
neural_network_descriptor[n].tile[m].weights
of the m-th memory tile descriptions of the n-th layer.

The plurality of output values for the m-th memory tile descriptions of the n-th layer are transferred in a step 232. In the example, the plurality of output values for the m-th memory tile descriptions of the n-th layer is sent by calculation hardware 110. In the example, the plurality of output values for the m-th memory tile descriptions of the n-th layer are received at memory controller 104.

In a step 234, a test sum CA is determined as a function of the plurality of output values.

$$CA = \sum_{j \in N} o_j$$

where test sum CA is formed via a set of neurons N of the m-th memory tile descriptions of the n-th layer according to a neuron function $o_j$ $$o_j = \sum_i x_i \cdot w_{j,i} + b_j$$

where neuron function $o_j$ in the example is determined as the addition of incorporated values $x_i$ weighted with $w_{j,i}$ and with a bias value $b_j$ of each neuron j.

In the example, the test sum is determined as $$CA=\text{Sum}(\text{Ofmap,dimension}=C)$$

where sum defines an addition of the plurality of values of the tensor Ofmap along a C dimension (dimension=x, x capable of being any dimension from the tensor form of Ofmap) of the tensor.

In a step 236, test sum CA is checked in a comparison with a reference value CAR.

The comparison is carried out in the example with reference value $o_c$. An error with the set N or in the reference value is present if:

$$\sum_{j \in N} o_j \neq o_c$$

In the example, the value of test sum CA is compared with reference value CAR. It may be provided to read reference value CAR form memory 102.

In the example, an error is identified or not depending on the result of the comparison. This represents an error identification. The error identification may be carried out for one layer or for multiple layers of the artificial neural network. If the error is identified, an error message 238 is transferred in the example by memory controller 104 to processor 108.

While test sum CA is determined, it may be provided to carry out a step 240, in which a result value is determined as a function of an output value of the plurality of output values and as a function of the activation function.

In this case, it may be provided to store the result value in a step 242 in memory 102. Result values for all output values are preferably determined, for which no error has been established.

It may be provided to carry out steps 240 and 242 only if no error is identified.

It may be provided that if an error is identified, an error signal is sent by memory controller 104, in particular, to a host.

It may be provided that if an error is identified, a recalculation of the output values is triggered by memory controller 104.

With the aid of the described approach, a plurality of weights and a plurality of input values are transferred by memory 102 via memory controller 104 to calculation hardware 110 for storing in calculation hardware 110 for the artificial neural network. A plurality of output values is also received by calculation hardware 110 at memory controller 104. This takes place with the described data format.

For calculation hardware 110, a network description for the artificial neural network is provided, which [includes] a list for a number n of layer descriptions. One layer description of the number n of layer descriptions described by way of example includes a number m of memory tile descriptions. The memory tile description of the memory tile described by way of example includes the start address of the tensor for input values of this memory tile, the start address of the tensor for weights of this memory tile and the start address of the tensor for output values of this memory tile.

In the example, a message that identifies this memory tile description in the list is sent in step 212 by calculation hardware 110. In response to this message, the memory tile description is received in step 214. Thus, the start addresses of the tensors are determined as a function of the memory tile description.

The above-described method provides that the layer description is provided for the artificial neural network for calculation hardware 110. This layer description defines at least one part of the layer of the artificial neural network. The part of the layer corresponds in the example to the memory tile. This layer description defines a tensor for input values of this memory tile, a tensor for weights of this memory tile and a tensor for output values of this memory tile. Tensors for an entire layer may also be defined.

For a transfer of these input values, a message that includes the start address of the tensor for these input values in the memory 102 is sent by calculation hardware 110 in step 216. For a transfer of these weights, a message that includes the start address of the tensor for these weights in memory 102, is sent by calculation hardware 110 in step 224. For a transfer of these output values, a message that includes the start address of the tensor for these output values in memory 102, is sent by calculation hardware 110 in step 232.

In the above-described approach, sum CK is determined as a function of the plurality of weights while the plurality of weights is transferred by memory 102 via memory controller 104 to calculation hardware 110, and a reference value CAR is determined as a function of the plurality of input values and of sum CK while the plurality of input values is transferred from memory 102 via memory controller 104 for storing in calculation hardware 110. While the plurality of output values is received at memory controller 104 by calculation hardware 110, test sum CA in this case is determined as a function of the plurality of output values. This test sum CA is checked in the comparison with reference value CAR. Depending on the result of the comparison, an error is identified in the example if test sum CA deviates from reference value CAR. Otherwise, no error is identified.

In one alternative, sum CK is determined as a function of the plurality of input values while the plurality of input values is transferred by memory 102 via memory controller 104 to calculation hardware 110. While the plurality of weights is transferred from memory 102 via memory controller 104 for storing in calculation hardware 110, reference value CAR is determined in this alternative as a function of the plurality of weights and of sum CK. While the plurality of output values is received by calculation hardware 110 at memory controller 104, test sum CA is determined in this case as a function of the plurality of output values and checked in the comparison with reference value CAR. Depending on the result of the comparison, an error is identified in the example if test sum CA deviates from reference value CAR. Otherwise, no error is identified.

What is claimed is:

1. A method for using an artificial neural network, the method comprising the following steps:

providing a layer description by a host processor to a memory controller, which defines at least one part of a layer of the artificial neural network, for a calculation hardware for the artificial neural network, the layer description defining a tensor for input values of at least one part of the layer, a tensor for weights of at least one part of the layer and a tensor for output values of at least one part of the layer, the memory controller storing the layer description in a memory;

receiving, via a data bus by the memory controller from the calculation hardware at least one message that includes: (i) a start address of the tensor for the input values in the memory for a transfer of the input values, and/or (ii) a start address of the tensor for the weights in the memory for a transfer of the weights, and/or (iii) a start address of the tensor for the output values in the memory for a transfer of the output values;

transferring, via the data bus by the memory controller to the calculation hardware, a plurality of weights from the memory to the calculating hardware for storing in the calculation hardware for the artificial neural network;

determining, by the memory controller, a sum as a function of the plurality of weights, when the plurality of weights is transferred by the memory controller from the memory to the calculation hardware via the data bus;

transferring, via the data bus by the memory controller to the calculation hardware, a plurality of input values from the memory for storing in the calculation hardware for the artificial neural network;

determining, by the memory controller, a reference value as a function of the plurality of the input values and of the sum, when the plurality of input values is transferred by the memory controller from the memory to the calculation hardware via the data bus;

receiving, via the data bus by the memory controller from the calculation hardware, a plurality of output values determined by the calculation hardware as a function of the plurality of input values and the plurality of weights;

determining, by the memory controller, a test sum as a function of the plurality of output values when the plurality of output values is received from the calculation hardware at the memory controller via the data bus;

checking, by the memory controller, the test sum in comparison with the reference value;

identifying, by the memory controller, an error based on a result of the comparison;

based on the identifying of the error, sending, via the data bus by the memory controller to the host processor, an error signal; and triggering, by the memory controller based on the identifying of the error, a recalculation by the calculation hardware, of at least one portion of the output values;

wherein the memory controller, the hardware calculation hardware, and the processor are separate from one another, wherein communication between the between the calculation hardware and the memory takes place exclusively via the memory controller, and wherein communication between the processor and the memory takes place exclusively via the memory controller.

2. The method as recited in claim 1, wherein for the calculation hardware, a network description for the artificial neural network is provided, which includes a list for a number of layer descriptions, one layer description of the number of layer descriptions including a number of memory tile descriptions, one memory tile description from the number of memory tile descriptions including the start address of the tensor for input values of the at least one part of the layer, the start address of the tensor for weights of the at least one part of the layer, and the start address of the tensor for output values of the at least one part of the layer, the message received by the memory controller from the calculation hardware identifying the memory tile description in the list, the memory tile description being received by the calculation hardware from the memory controller in response to the message, and the start addresses of the tensors being determined as a function of the memory tile description.

3. The method as recited in claim 1, wherein an error identification is carried out for at least one layer of the artificial neural network.

4. The method as recited in claim 1, wherein a read request for a plurality of weights of one layer of an artificial neural network is received, the plurality of weights being read from the memory.

5. The method as recited in claim 4, wherein a read request for a plurality of input values for the layer of the artificial neural network is received, the plurality of input values being read from the memory.

6. The method as recited in claim 5, wherein a plurality of output values of the layer is determined as a function of the plurality of input values and of the plurality of weights.

7. The method as recited in claim 5, wherein when no error is identified, a result value is determined as a function of an output value of the plurality of output values and as a function of an activation function.

8. The method according to claim 1, wherein the reference value is determined using a two-dimensional convolution.

9. A non-transitory computer-readable storage medium on which is stored a computer program including computer-readable instructions for machine learning using an artificial neural network, the instructions, when executed by a computer, causing the computer to perform the following steps:

providing a layer description by a host processor to a memory controller, which defines at least one part of a layer of the artificial neural network, for a calculation hardware for the artificial neural network, the layer description defining a tensor for input values of at least one part of the layer, a tensor for weights of at least one part of the layer and a tensor for output values of at least one part of the layer, the memory controller storing the layer description in a memory; and receiving, via a data bus by the memory controller from the calculation hardware: (i) a message that includes a start address of the tensor for the input values in the memory for a transfer of the input values, or (ii) a message that includes a start address of the tensor for the weights in the memory for a transfer of the weights, or (iii) a message that includes a start address of the tensor for the output values in the memory for a transfer of the output values;

transferring, via a data bus by the memory controller to the calculation hardware, a plurality of weights from the memory to the calculating hardware for storing in the calculation hardware for the artificial neural network;

determining, by the memory controller, a sum of the plurality of weights, when the plurality of weights is transferred by the memory controller from the memory to the calculation hardware via the data bus;

transferring, via the data bus by the memory controller to the calculation hardware, a plurality of input values from the memory for storing in the calculation hardware for the artificial neural network;

determining, by the memory controller, a reference value as a function of the plurality of the input values and of the sum, when the plurality of input values is transferred by the memory controller from the memory to the calculation hardware via the data bus;

receiving, via the data bus by the memory controller from the calculation hardware, a plurality of output values determined by the calculation hardware as a function of the plurality of input values and the plurality of weights;

determining, by the memory controller, a test sum as a function of the plurality of output values when the plurality of output values is received from the calculation hardware at the memory controller via the data bus;

checking, by the memory controller, the test sum in comparison with the reference value;

identifying, by the memory controller, an error based on a result of the comparison;

based on the identifying of an error, sending, via the data bus by the memory controller to the host processor, an error signal; and triggering, by the memory controller, based on the identifying of the error, a recalculation by the calculation hardware, of at least one portion of the output values;

wherein the memory controller, the hardware calculation hardware, and the processor are separate from one another, wherein communication between the between the calculation hardware and the memory takes place exclusively via the memory controller, and wherein communication between the processor and the memory takes place exclusively via the memory controller.

10. The non-transitory computer-readable storage medium according to claim 9, wherein the reference value is determined using a two-dimensional convolution.

11. A device for machine learning using an artificial neural network, the device configured to:

provide a layer description, which defines at least one part of a layer of the artificial neural network, for a calculation hardware for the artificial neural network, the layer description defining a tensor for input values of at least one part of the layer, a tensor for weights of at least one part of the layer and a tensor for output values of at least one part of the layer; and receive, via a data bus by a memory controller from the calculation hardware: (i) a message that includes a start address of the tensor for the input values in a memory for a transfer of the input values, or (ii) a message that includes a start address of the tensor for the weights in the memory for a transfer of the weights, or (iii) a message that includes a start address of the tensor for the output values in the memory for a transfer of the output values;

transfer, via a data bus by the memory controller to the calculation hardware, a plurality of weights from the memory to the calculating hardware for storing in the calculation hardware for the artificial neural network;

determine, by the memory controller, a sum of the plurality of weights, when the plurality of weights is transferred by the memory controller from the memory to the calculation hardware via the data bus;

transfer, via the data bus by the memory controller to the calculation hardware, a plurality of input values from the memory for storing in the calculation hardware for the artificial neural network;

determine, by the memory controller, a reference value as a function of the plurality of the input values and of the sum, when the plurality of input values is transferred by the memory controller from the memory to the calculation hardware via the data bus;

receive, via the data bus by the memory controller from the calculation hardware, a plurality of output values determined by the calculation hardware as a function of the plurality of input values and the plurality of weights;

determine, by the memory controller, a test sum as a function of the plurality of output values when the plurality of output values is received from the calculation hardware at the memory controller via the data bus;

check, by the memory controller, the test sum in comparison with the reference value;

identify, by the memory controller, an error based on a result of the comparison;

based on the identifying of the error, send, via the data bus by the memory controller to a host processor, an error signal; and trigger, by the memory controller, based on the identifying of the error, a recalculation by the calculation hardware, of at least one portion of the output values;

wherein the memory controller, the hardware calculation hardware, and the processor are separate from one another, wherein communication between the between the calculation hardware and the memory takes place exclusively via the memory controller, and wherein communication between the processor and the memory takes place exclusively via the memory controller.

12. The device according to claim 11, wherein the reference value is determined using a two-dimensional convolution.

13. A method for using an artificial neural network, the method comprising the following steps:

providing a layer description by a host processor to a memory controller, which defines at least one part of a layer of the artificial neural network, for a calculation hardware for the artificial neural network, the layer description defining a tensor for input values of at least one part of the layer, a tensor for weights of at least one part of the layer and a tensor for output values of at least one part of the layer, the memory controller storing the layer description in a memory;

receiving, via a data bus by the memory controller from the calculation hardware: (i) a message that includes a start address of the tensor for the input values in the memory for a transfer of the input values, or (ii) a message that includes a start address of the tensor for the weights in the memory for a transfer of the weights, or (iii) a message that includes a start address of the tensor for the output values in the memory for a transfer of the output values;

transferring, via the data bus by the memory controller to the calculation hardware, a plurality of weights from the memory for storing in the calculation hardware for the artificial neural network;

transferring, via the data bus by the memory controller to the calculation hardware, a plurality of input values from the memory for storing in the calculation hardware for the artificial neural network;

determining, by the memory controller, a sum of the plurality of input values, when the plurality of input values is transferred by the memory controller from the memory to the calculation hardware via the data bus;

determining, by the memory controller, a reference value as a function of the plurality of weights and of the sum when the plurality of weights is transferred by the memory controller from the memory to the calculation hardware via the data bus for storing in the calculation hardware;

receiving, via the data bus by the memory controller, a plurality of output values determined by the calculation hardware as a function of the plurality of input values and the plurality of weights;

determining, via the data bus by the memory controller, a test sum as a function of the plurality of output values, when the plurality of output values is received from the calculation hardware at the memory controller via the data bus;

checking, via the data bus by the memory controller, the test sum in a comparison with the reference value;

identifying, by the memory controller, an error based on a result of the comparison;

based on the identifying of the error, sending, via the data bus by the memory controller to the host processor, an error signal; and triggering, by the memory controller, based on the identifying of the error, a recalculation by the calculation hardware, of at least one portion of the output values;

wherein the memory controller, the hardware calculation hardware, and the processor are separate from one another, wherein communication between the between the calculation hardware and the memory takes place exclusively via the memory controller, and wherein communication between the processor and the memory takes place exclusively via the memory controller.

14. The method as recited in claim 13, wherein an error identification is carried out for at least one layer of the artificial neural network.

15. The method according to claim 13, wherein the reference value is determined using a two-dimensional convolution.

\* \* \* \* \*